United States Patent
Bergen et al.

(10) Patent No.: US 10,081,857 B2
(45) Date of Patent: Sep. 25, 2018

(54) METALLIC FLAT PRODUCT WHICH IS SUBJECTED TO SURFACE FINISHING BY HOT-DIP COATING AND WHICH IS PREFERABLY COMPOSED OF STEEL

(71) Applicant: ThyssenKrupp Steel Europe AG, Duisburg (DE)

(72) Inventors: Jegor Bergen, Rheinberg (DE); Frank Spelleken, Dinslaken (DE); Michael Peters, Kleve (DE); Manuela Ruthenberg, Dortmund (DE); Friedhelm Macherey, Alpen (DE); Florian Spelz, Oberhausen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 14/765,740

(22) PCT Filed: Jan. 6, 2014

(86) PCT No.: PCT/EP2014/050091
§ 371 (c)(1),
(2) Date: Aug. 4, 2015

(87) PCT Pub. No.: WO2014/121956
PCT Pub. Date: Aug. 14, 2014

(65) Prior Publication Data
US 2015/0368777 A1    Dec. 24, 2015

(30) Foreign Application Priority Data
Feb. 5, 2013   (DE) .................. 10 2013 101 134

(51) Int. Cl.
*C23C 2/06*  (2006.01)
*C23C 2/40*  (2006.01)
(Continued)

(52) U.S. Cl.
CPC ............ *C23C 2/06* (2013.01); *B32B 15/01* (2013.01); *B32B 15/012* (2013.01);
(Continued)

(58) Field of Classification Search
CPC ....... C23C 2/40; C23C 28/025; C23C 28/028; C23C 2/12; C23C 28/023; C23C 2/06;
(Continued)

(56) References Cited

U.S. PATENT DOCUMENTS 8,481,172 B2      7/2013  Warnecke et al.
2010/0086806 A1*  4/2010  Koumura .................. C23C 2/06
                                                        428/659

FOREIGN PATENT DOCUMENTS

EP   1013785 A1   6/2000
FR   2758571 A1   7/1998
(Continued)

OTHER PUBLICATIONS

Machine Translation, Phillipe et al., FR 2758571, Jul. 1998.*
Machine Translation, Masaaki, JP 09-272986, Oct. 1997.*

*Primary Examiner* — Michael E. La Villa
(74) *Attorney, Agent, or Firm* — The Webb Law Firm

(57) ABSTRACT

A metallic flat product is disclosed which is subjected to surface finishing by hot-dip coating and which is preferably composed of steel. The metallic flat product includes a metallic alloy layer (11) and a metallic surface layer (12'), which metallic alloy layer and metallic surface layer differ from one another in terms of their chemical composition. The two layers (11, 12') are produced in a one process step and define a continuous transition region (13) in which a mixture of the two different chemical compositions is present. The metallic alloy layer (11) has a thickness of less than 8 μm, preferably less than 6 μm, and the surface layer (12') is formed from aluminum or zinc. The flat product has an improved coating, by means of which the flat product more
(Continued)

effectively satisfies the requirements with regard to good deformability and has good anti-corrosion protection.

10 Claims, 4 Drawing Sheets

(51) Int. Cl.
| | |
|---|---|
| *C23C 2/12* | (2006.01) |
| *C23C 28/02* | (2006.01) |
| *C23C 30/00* | (2006.01) |
| *C23C 2/04* | (2006.01) |
| *C23C 2/02* | (2006.01) |
| *B32B 15/01* | (2006.01) |
| *B32B 15/04* | (2006.01) |

(52) U.S. Cl.
CPC .......... *B32B 15/013* (2013.01); *B32B 15/016* (2013.01); *B32B 15/017* (2013.01); *B32B 15/04* (2013.01); *B32B 15/043* (2013.01); *C23C 2/02* (2013.01); *C23C 2/04* (2013.01); *C23C 2/12* (2013.01); *C23C 2/40* (2013.01); *C23C 2/405* (2013.01); *C23C 28/02* (2013.01); *C23C 28/021* (2013.01); *C23C 28/023* (2013.01); *C23C 28/025* (2013.01); *C23C 28/028* (2013.01); *C23C 30/00* (2013.01); *C23C 30/005* (2013.01); *Y10T 428/1275* (2015.01); *Y10T 428/12729* (2015.01); *Y10T 428/12736* (2015.01); *Y10T 428/12743* (2015.01); *Y10T 428/12757* (2015.01); *Y10T 428/12764* (2015.01); *Y10T 428/12792* (2015.01); *Y10T 428/12799* (2015.01); *Y10T 428/12972* (2015.01); *Y10T 428/12979* (2015.01); *Y10T 428/2495* (2015.01); *Y10T 428/24967* (2015.01); *Y10T 428/24975* (2015.01); *Y10T 428/26* (2015.01); *Y10T 428/263* (2015.01); *Y10T 428/264* (2015.01); *Y10T 428/265* (2015.01)

(58) Field of Classification Search
CPC .. C23C 2/04; C23C 2/02; C23C 2/405; C23C 28/021; C23C 28/02; C23C 30/00; C23C 30/005; Y10T 428/12799; Y10T 428/12972; Y10T 428/12757; Y10T 428/12792; Y10T 428/12979; Y10T 428/1275; Y10T 428/12743; Y10T 428/12736; Y10T 428/12764; Y10T 428/12729; Y10T 428/2495; Y10T 428/24967; Y10T 428/24975; Y10T 428/263; Y10T 428/264; Y10T 428/265; Y10T 428/26; B32B 15/01; B32B 15/012; B32B 15/013; B32B 15/016; B32B 15/017; B32B 15/04; B32B 15/043
See application file for complete search history.

(56) References Cited

FOREIGN PATENT DOCUMENTS

| | | |
|---|---|---|
| GB | 1574814 | 12/1977 |
| JP | 860329 A | 3/1996 |
| JP | 9272986 A | 10/1997 |
| WO | 2007132007 A1 | 11/2007 |

\* cited by examiner

METALLIC FLAT PRODUCT WHICH IS SUBJECTED TO SURFACE FINISHING BY HOT-DIP COATING AND WHICH IS PREFERABLY COMPOSED OF STEEL

CROSS-REFERENCE TO RELATED APPLICATIONS

This application is the United States national phase of International Application No. PCT/EP2014/050091 filed Jan. 6, 2014, and claims priority to German Patent Application No. 10 2013 101 134.9 filed Feb. 5, 2013, the disclosures of which are hereby incorporated in their entirety by reference.

BACKGROUND OF THE INVENTION

Field of the Invention

The invention relates to a metallic flat product which is subjected to surface finishing by hot-dip coating and which is preferably composed of steel, having a metallic alloy layer and having, on top of the latter, a metallic surface layer, which metallic alloy layer and metallic surface layer differ from one another in terms of their chemical composition, wherein the two layers are produced in one process step and define a continuous transition region in which a mixture of the two different chemical compositions is present, wherein the alloy layer has a thickness of less than 8 µm, preferably less than 6 µm, and wherein the surface layer is formed from aluminum or zinc.

Description of Related Art

In the present context, a metallic flat product is to be understood to mean a product which has an approximately rectangular cross section and whose width is very much greater than its thickness. The flat product is for example in the form of a metal sheet, in particular a blank, or a metal strip.

The hot-dip coating of metal strip, in particular steel strip, is a method that has been known for many years for the surface finishing of fine sheet-metal strip in order to protect it against corrosion. FIG. 3 illustrates, in a vertical sectional view, a section of a conventional installation for the hot-dip coating of a metal strip 1. A steel strip (fine sheet-metal strip) which is to be correspondingly finished is, for this purpose, initially cleaned, and subjected to recrystallization annealing, in a continuous furnace 2. Subsequently, the strip 1 is subjected to hot-dip coating by being led through a molten metal bath 3. As coating material for the strip 1, use is made for example of zinc, zinc alloys, pure aluminum or aluminum alloys.

The continuous furnace 2 typically comprises a directly heated preheater and indirectly heated reduction and holding zones, and also downstream cooling zones. At the end of the cooling zone, the furnace 2 is connected via a port (snout) 6 to the melting bath 3. A diverting roller (Pott roller) 7 arranged in the melting bath 3 causes the strip 1 entering the melting bath from the snout 6 to be diverted into a substantially vertical direction. The layer thickness of the metal layer which serves for anti-corrosion protection is normally set by way of stripping jets 5.

As a steel strip 1 passes through the melting bath 3, an alloy layer composed of iron and the coating metal is formed on the surface of the strip. Above this, as a surface layer, a metal layer is formed whose composition corresponds to the chemical analysis of the metal melts situated in the melting bath vessel 4.

Depending on the melt composition, the coating has different characteristics, in particular with regard to mechanical and anti-corrosion protection characteristics. Also, the melt composition has an influence on the surface quality of the coated strip.

In the case of conventional hot-dip coating of steel strip with an aluminum melt which comprises approximately 10 wt % silicon, a relatively thin alloy layer is formed at the interface between steel and coating metal. On the alloy layer there is formed a surface layer composed of aluminum and ferrosilicon inclusions. This coating, known under the name FAL type 1, is, owing to the thin alloy layer, ductile enough to permit satisfactory realization of desired deformations of the flat product. The anti-corrosion protection realized by means of this coating is however not as good as that realized in the case of a pure aluminum coating (FAL type 2).

The lining produced through the use of a pure aluminum melt provides excellent anti-corrosion protection. Owing to the absence of silicon in the melt, however, a relatively thick brittle alloy layer forms, which exhibits a tendency for crack formation and for peeling of the metal coating, during the deformation of the coated flat product. Owing to the restricted ductility, this product (FAL type 2) is suitable only for components which do not require any intense deformations.

In the prior art, it is therefore the case that a corresponding composition of the metallic melting bath is selected in a manner dependent on the desired characteristics, that is to say, with a compromise solution, there is always a balancing act between the requirements such as, for example, the mechanical characteristics for the subsequent deformation of the coated fine metal sheet with the avoidance of cracks in the coating or peeling of said coating, on the one hand, and reliable anti-corrosion protection, on the other hand.

It is also known in the prior art for steel strips that have been subjected to finishing by hot-dip coating to be subjected to additional heat treatment in order to reduce the risk of crack formation and peeling of the coating during the deformation. Alternatively, the coating may also be applied in multiple working steps. These measures are however associated with additional expenditure of time and costs. Furthermore, the production characteristics may be impaired by oxide formation, for example between the working steps, or by microstructural changes resulting from the heat treatment.

SUMMARY OF THE INVENTION

The present invention is based on the object of providing a metallic flat product of the type mentioned in the introduction which has an improved coating and which, as it were, more effectively satisfies the requirements with regard to good deformability and with regard to good anti-corrosion protection.

The flat product according to the invention is preferably composed of steel. Owing to a particular hot-dip coating process, said flat product has a metallic alloy layer and, on top of the latter, a metallic surface layer, which metallic alloy layer and metallic surface layer differ from one another in terms of their chemical composition, wherein the two layers are produced in one process step and define a continuous transition region in which a mixture of the two different chemical compositions is present. The alloy layer has a thickness of less than 8 µm, preferably less than 6 µm, particularly preferably less than 5 μm. The surface layer is formed from aluminum or zinc and is substantially free from silicon, and has a thickness of greater than 4 μm, preferably greater than 5 μm.

The flat product according to the invention is, owing to the relatively thin alloy layer, ductile enough that desired relatively intense deformations can be realized. At the same time, owing to the surface layer which is formed from aluminum or zinc and which is substantially free from silicon, said flat product exhibits excellent anti-corrosion protection characteristics. In the present context, the expression "substantially free from silicon" means that the surface layer formed from aluminum or zinc is free from silicon aside from inevitable impurities.

Adequate ductility of the flat product can be obtained in particular if, as per a preferred embodiment of the invention, the alloy layer is formed from a metal melt comprising silicon.

Particularly good anti-corrosion protection characteristics are obtained if, as per a further preferred embodiment of the invention, the surface layer is formed from pure aluminum.

Another advantageous embodiment of the flat product according to the invention is characterized in that the surface layer is formed from a metal melt comprising aluminum and zinc. In this embodiment, too, the flat product according to the invention is distinguished by particularly good anti-corrosion protection characteristics. Here, the alloy layer situated under the surface layer may in turn advantageously be formed from a metal melt comprising silicon.

A further advantageous embodiment of the flat product according to the invention consists in that the surface layer is formed from a metal melt comprising zinc and magnesium. In this case, the alloy layer is preferably formed from a metal melt which has an aluminum and magnesium content at least 20% lower than the aluminum and magnesium content of the surface layer. The alloy layer is however particularly preferably formed from a metal melt which is substantially free from aluminum and magnesium. In these embodiments, the flat product according to the invention is again distinguished by adequate ductility and excellent anti-corrosion protection characteristics. Furthermore, owing to the magnesium, said flat product has a relatively low weight (surface layer weight) and good noise deadening characteristics.

To obtain a good connection between the metallic alloy layer and the metallic surface layer, and thus eliminate or at least reduce the risk of peeling of the metallic coating during the deformation of the flat product, a further preferred embodiment of the invention provides that the thickness of the continuous transition region that is present between the alloy layer and the surface layer on top of said alloy layer amounts to at least 2 μm, preferably at least 3 μm, and/or is correspondingly set through the implementation, according to the invention, of the hot-dip coating process.

BRIEF DESCRIPTION OF THE DRAWINGS

The invention will be discussed in more detail below on the basis of a drawing, which illustrates several exemplary embodiments. In the drawing, in each case schematically.

DESCRIPTION OF THE INVENTION

Figure 1:
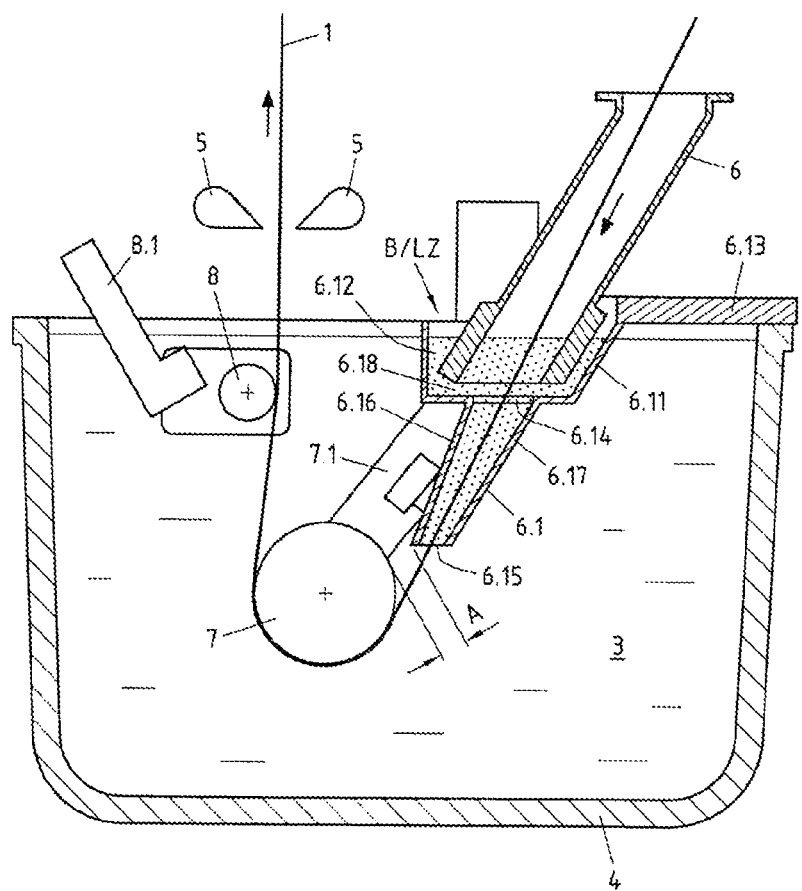
FIG. 1 shows a vertical sectional view of a melting bath vessel with an elongated snout, a diverting roller and a stabilizing roller.
Figure 2:
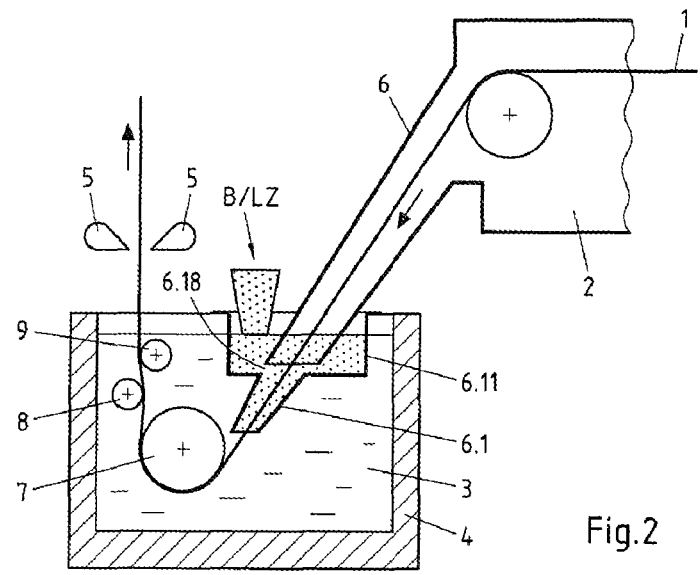
FIG. 2 shows a further exemplary embodiment of a device according to the invention, having a melting bath vessel, which is illustrated in vertical section, and two stabilizing rollers arranged therein.
Figure 3:
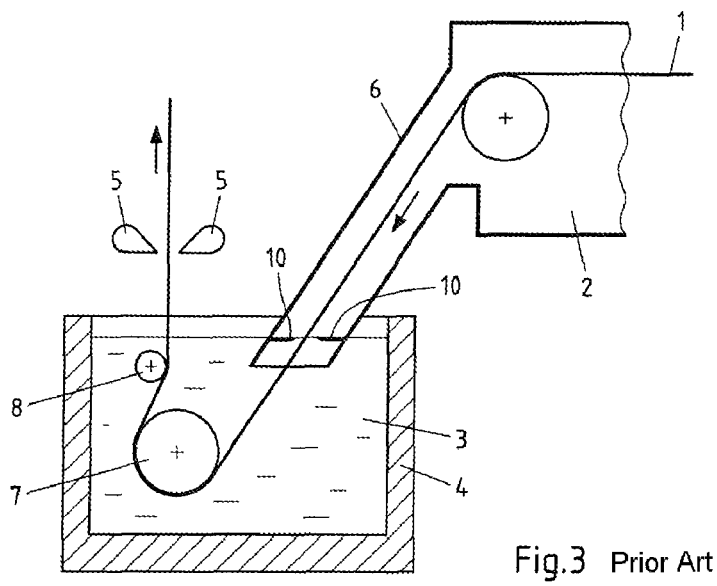
FIG. 3 shows a device for the hot-dip coating of metal strip as per the prior art, in a vertical sectional view.
Figure 5:
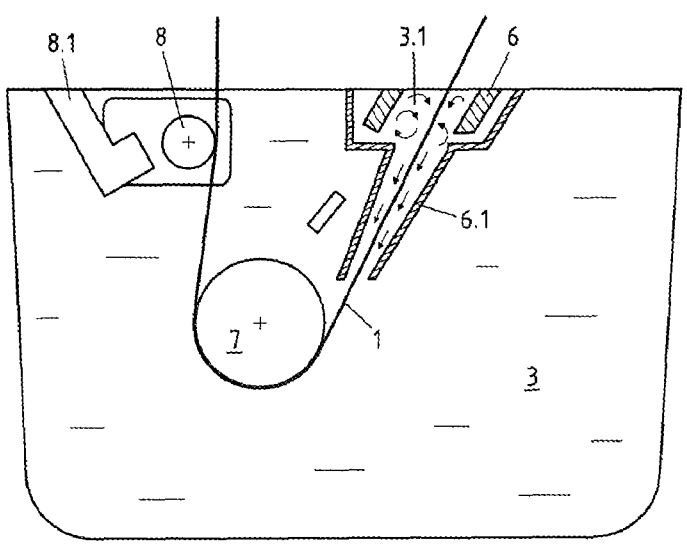
FIG. 5 shows a melting bath of a device according to the invention for the hot-dip coating of metal strip.

In the exemplary embodiments, illustrated in FIGS. 1, 2 and 5, of a device according to the invention for the hot-dip coating of metal strip, in particular steel strip, the snout 6 of a generic coating installation, which may correspond or corresponds substantially to the coating installation as per FIG. 3, is designed such that the immersed section of the snout 6 can have coating material B and/or at least one alloy additive LZ supplied to it separately. The device according to the invention is thus designed such that, in the region delimited by the snout 6, a melt can be implemented or used which is implemented differently, in terms of its chemical composition, than the chemical composition of the melt used in the melting bath 3.

For this purpose, the snout 6 is preferably equipped with a shaft-shaped snout elongation piece 6.1 for increasing the snout immersion depth. The snout elongation piece 6.1 has an attachment section 6.11 into which the lower end of the snout 6 projects. The attachment section 6.11 has a basin or trough-shaped receiving chamber 6.12, the encircling side wall of which is fastened to a support 6.13 mounted on the upper edge of the melting bath vessel 4. In the base of the attachment section 6.11 or receiving chamber 6.12, there is formed an elongate opening 6.14 through which the metal strip 1 to be coated runs into the shaft-shaped snout elongation piece 6.1.

The snout 6 or the snout elongation piece 6.1 is preferably designed such that its clear inner width or clear inner height tapers toward the outlet opening 6.15 at least over a length segment. The tapering of the inner width or inner height arises from the fact that the walls 6.16, 6.17, facing toward the top side and bottom side of the strip 1, of the snout 6 or snout elongation piece 6.1 converge in the direction of the outlet opening 6.15. The inner width or inner height of the snout or snout elongation piece 6.1 is preferably characterized, in these exemplary embodiments, by a continuous tapering.

The outlet opening 6.15, or narrowest point of the snout elongation piece 6.1, preferably has a clear inner width of at most 120 mm, particularly preferably at most 100 mm. Furthermore, the snout elongation piece 6.1 is dimensioned so as to end at a distance A in the range from 100 mm to 400 mm, preferably 100 mm to 300 mm, from the shell surface of the diverting roller 7. The distance A between the lower end of the snout elongation piece 6.1 and the shell surface of the diverting roller 7 amounts to for example approximately 200 mm.

As is known per se, the diverting roller 7 is assigned a stabilizing roller 8 in order to ensure that the strip 1 passes in flat form, and in vibration-free fashion, through the flat jets 5, or jet stripping device, arranged above the melt bath. The support arms of the diverting roller 7 and of the stabilizing roller 8 are denoted in FIG. 1 by 7.1 and 8.1.

Furthermore, the stabilizing roller 8 may be combined with a guide or pressing roller 9 which is likewise arranged so as to be immersed (cf. FIG. 2).

In the exemplary embodiments of the device according to the invention illustrated in FIGS. 1 and 2, the attachment section 6.11 of the snout elongation piece 6.1 and the snout 6 define at least one feed duct 6.18 via which coating material B and/or at least one alloy additive LZ can be supplied separately into the immersed section of the snout 6 and/or into the snout elongation piece 6.1.

The elongation, according to the invention, of the snout 6 serves to realize the most extensive possible decoupling of the melt that is implemented or used in the snout 6 from the melt that is implemented/used in the rest of the melting bath vessel 4, which differs in terms of its chemical composition from the melt that is implemented/used in the snout 6. This gives rise, in the melting bath 3, to regions with different melt compositions, in order to implement particular desired alloy coating characteristics. This will be discussed in more detail below with reference to FIGS. 6 to 8.

Figure 6:
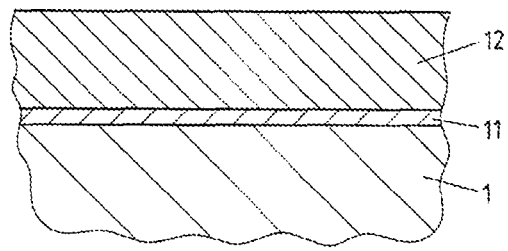
FIG. 6 shows a cross-sectional view of a section of a steel strip coated by immersion in an AlFeSi melt.

In the case of conventional hot-dip coating of steel strip with an aluminum melt which comprises approximately 10 wt % silicon, a relatively thin alloy layer 11 forms at the interface between steel and coating metal (FIG. 6). The thickness of the alloy layer 11 amounts to for example approximately 4 μm. The alloy layer 11 is followed by the surface layer 12 composed of aluminum and ferrosilicon inclusions. This coating, known under the name FAL type 1, is, owing to the thin alloy layer 11, ductile enough to permit satisfactory realization of desired deformations of the coated steel strip 1 or steel sheet. The anti-corrosion protection realized by means of this coating is however not as good as that realized in the case of a pure aluminum coating, which is normally referred to as FAL type 2.

Figure 7:
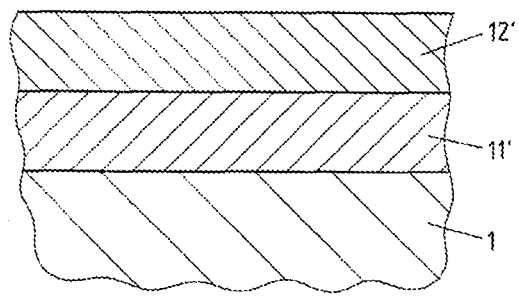
FIG. 7 shows a cross-sectional view of a section of a steel strip coated by immersion in a pure aluminum melt.

FIG. 7 shows a cross-sectional view of a section of a steel strip 1 coated by immersion in a pure aluminum melt. This lining provides excellent anti-corrosion protection. 12' denotes the surface layer composed of pure aluminum. Owing to the absence of silicon in the melt, a relatively thick alloy layer 11', which is relatively brittle, forms at the interface between steel and coating metal. The thickness of the alloy layer 11' may amount to for example up to 20 μm. The brittle alloy layer 11' exhibits tendency for crack formation, and for peeling of the metal coating, during the deformation of the coated steel strip 1 or steel sheet. Owing to the restricted ductility, this product (FAL type 2) is suitable only for simple components which do not require any intense deformations.

Figure 8:
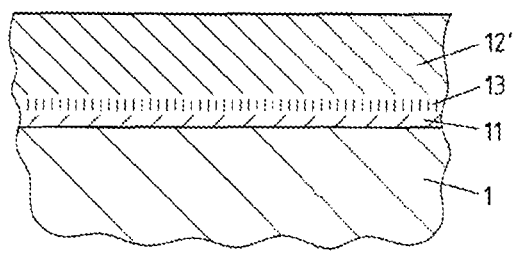
FIG. 8 shows a cross-sectional view of a section of a metal strip coated by immersion in two different metallic melts.

The device according to the invention illustrated in FIG. 1 or FIG. 2, in which the snout 6 and the attachment section 6.11 of the snout elongation piece 6.1 define at least one feed duct 6.18, makes it possible, for example, to enrich a melt comprising silicon in the snout 6, leading to a thin alloy layer 11 similar to the alloy layer of the product FAL type 1. For example, an AlFeSi coating material may be supplied to the snout 6 via the basin-shaped attachment section 6.11 of the snout elongation piece 6.1 and the feed duct 6.18. By contrast, it is preferably the case that a pure aluminum melt is used in the melting bath vessel 4 itself, such that a surface layer 12' composed of pure aluminum is obtained. This product ("FAL type 3"), which is depicted in FIG. 8, combines the advantages of the products FAL type 1 and FAL type 2. This is because, in this way, a product is obtained which, owing to the thin alloy layer 11, is ductile enough that desired relatively intense deformations can be realized, and which, furthermore, owing to the surface layer 12' composed of pure aluminum, exhibits excellent anti-corrosion protection characteristics.

Instead of a pure aluminum melt, it is also possible for some other metallic melt to be used in the melting bath vessel 4. For example, an aluminum-zinc melt may be used in the melting bath vessel 4, whereas, in the region delimited by the snout 6, a melt is used which is likewise based on an aluminum-zinc melt but which additionally has, or has had, silicon added to it for the purposes of suppressing or reducing the alloy layer, whereby improved deformability is attained.

A further example for the use, according to the invention, of melts with different chemical compositions is the use of a zinc-magnesium melt in the melting bath vessel 4, whereas a melt with reduced zinc, aluminum and/or magnesium content is used in the snout 6. In this way, it is possible to reduce instances of insufficient wetting in the coating of the strip 1, and thus to improve the surface quality of the hot-dip coated strip.

In the case of prior art coating systems as per FIG. 3, it is sometimes the case that slag 10 accumulates on the surface of the melt 3 within the snout 6, which slag can lead to flaws in the coating of the metal strip 1. Tests have shown that such slag-induced coating flaws can be prevented by increasing the depth of immersion of the snout 6 in conjunction with a tapering of the clear inner width or clear inner height of the immersed snout elongation piece 6.1 toward the outlet opening 6.15. The tapering of the snout elongation piece 6.1 in the direction of the outlet opening 6.15 furthermore contributes to the decoupling of the different melts that are used in the snout 6 and in the rest of the melting bath vessel 4.

Figure 4:
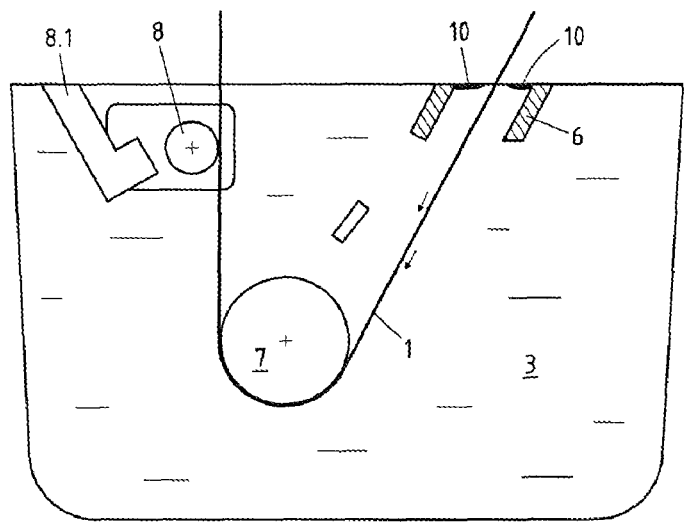
FIG. 4 shows a melting bath of a device for the hot-dip coating of metal strip as per the prior art.

In FIGS. 4 and 5, the speed distribution of the melt flow encountered in the melting bath vessel during the operation of a prior art coating device (FIG. 4) and during the operation of a coating device according to the invention (FIG. 5) is depicted. A comparison of FIGS. 4 and 5 shows that, by means of the snout elongation 6.1, the flow in the snout 6, in particular in that region 3.1 of the melting bath surface enclosed by the snout 6, is intensified, which results in a continuous exchange of the melt at the melting bath surface in the snout 6. In this way, no slag, which causes surface flaws in the coating of the strip 1, can accumulate in that region 3.1 of the melting bath surface which is enclosed by the snout 6.

The embodiment of the invention is not restricted to the exemplary embodiments illustrated in the drawing. Rather, numerous variants are conceivable which make use of the invention specified in the appended claims even in the case of a different design.

The invention claimed is:

1. A metallic flat strip or sheet product which is subjected to surface finishing by hot-dip coating, comprising a metallic alloy layer and having, on top of the metallic alloy layer, a metallic surface layer, wherein the metallic alloy layer and the metallic surface layer are formed by the surface finishing by hot-dip coating, wherein the metallic alloy layer and the metallic surface layer differ from one another in terms of their chemical composition, wherein the metallic alloy layer and the metallic surface layer are produced in a single surface finishing process by transferring the flat strip or sheet product directly from a first melt bath to a second melt bath without exposure to a medium other than the first melt bath and the second melt bath, wherein the metallic alloy layer and the metallic surface layer define a continuous transition region in which a mixture of the chemical compositions of the metallic alloy layer and the metallic surface layer are present, wherein the metallic alloy layer has a thickness of less than 8 μm, wherein the metallic surface layer is formed from aluminum or zinc, wherein the metallic surface layer is substantially free from silicon and has a thickness of greater than 4 μm, and wherein a thickness of the continuous transition region that is present between the metallic alloy layer and the metallic surface layer on top of said metallic alloy layer amounts to at least 2 μm.

2. The metallic flat strip or sheet product as claimed in claim 1, wherein the metallic alloy layer is formed from a metal melt comprising silicon.

3. The metallic flat strip or sheet product as claimed in claim 1, wherein the metallic surface layer is formed from a metal melt comprising pure aluminum.

4. The metallic flat strip or sheet product as claimed in claim 1, wherein the metallic surface layer is formed from a metal melt comprising aluminum and zinc.

5. The metallic flat strip or sheet product as claimed in claim 1, wherein the metallic surface layer is formed from a metal melt comprising zinc and magnesium.

6. The metallic flat strip or sheet product as claimed in claim 5, wherein the metallic alloy layer is formed from a metal melt which has a combined aluminum and magnesium content at least 20% lower than a combined aluminum and magnesium content of the metallic surface layer.

7. The metallic flat strip or sheet product as claimed in claim 5, wherein the metallic alloy layer is formed from a metal melt which is substantially free from aluminum and magnesium.

8. The metallic flat strip or sheet product as claimed in claim 1, wherein the metallic flat product comprises steel.

9. The metallic flat strip or sheet product as claimed in claim 1, wherein the metallic alloy layer has a thickness less than 6 μm.

10. The metallic flat strip or sheet product as claimed in claim 1, wherein the metallic surface layer has a thickness greater than 5 μm.

* * * * *